United States Patent
Gemin et al.

(10) Patent No.: US 9,096,295 B2
(45) Date of Patent: Aug. 4, 2015

(54) HYBRID POWER AND PROPULSION SYSTEM

(71) Applicant: General Electric Company, Schenectady, NY (US)

(72) Inventors: Paul Robert Gemin, Niskayuna, NY (US); Herman Lucas Norbert Wiegman, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 13/731,234

(22) Filed: Dec. 31, 2012

(65) Prior Publication Data

US 2014/0187107 A1    Jul. 3, 2014

(51) Int. Cl.
| | |
|---|---|
| *B63H 21/20* | (2006.01) |
| *B63H 21/22* | (2006.01) |
| *B63B 35/66* | (2006.01) |
| *B63H 5/125* | (2006.01) |
| *B63H 21/21* | (2006.01) |

(52) U.S. Cl.
CPC ............... *B63B 35/66* (2013.01); *B63H 21/20* (2013.01); *B63H 21/22* (2013.01); *B63H 2005/1256* (2013.01); *B63H 2021/205* (2013.01); *B63H 2021/216* (2013.01); *Y02T 70/5236* (2013.01); *Y10S 903/902* (2013.01)

(58) Field of Classification Search
USPC ..................................... 440/3, 4, 6, 75, 83, 86
See application file for complete search history.

(56) References Cited

U.S. PATENT DOCUMENTS

| | | | |
|---|---|---|---|
| 5,035,662 A | 7/1991 | Royset | |
| 5,522,335 A | 6/1996 | Veronesi et al. | |
| 5,947,855 A | 9/1999 | Weiss | |
| 7,147,523 B2 * | 12/2006 | Mori et al. | 440/3 |
| 7,241,192 B2 | 7/2007 | Andersen et al. | |
| 7,585,195 B2 | 9/2009 | Vartdal | |
| 7,645,174 B2 | 1/2010 | Chung et al. | |
| 7,862,393 B2 * | 1/2011 | Levander et al. | 440/3 |
| 7,878,874 B2 | 2/2011 | Gruenwald | |
| 8,062,081 B2 * | 11/2011 | Barrett et al. | 440/6 |
| 8,118,627 B2 | 2/2012 | Wejrzanowski et al. | |
| 8,159,082 B2 | 4/2012 | Gemin et al. | |
| 8,556,668 B2 * | 10/2013 | Kodera et al. | 440/3 |
| 2005/0164574 A1 | 7/2005 | Levander | |
| 2010/0203777 A1 | 8/2010 | Bratel | |
| 2011/0281679 A1 | 11/2011 | Larrabee et al. | |

OTHER PUBLICATIONS

Adnanes, "Maritime Electrical Installations and Diesel Electric Propulsion", ABB AS Marine, Apr. 22, 2003.

* cited by examiner

*Primary Examiner* — Lars A Olson

(74) *Attorney, Agent, or Firm* — GE Global Patent Operation; John A. Kramer

(57) ABSTRACT

An azimuthing drive system is provided for marine vessels. The azimuthing drive system includes a propulsion pod that houses a propulsor, which is configured to rotate about a first axis and to be driven by a first shaft generally orthogonal to the first axis. The propulsion pod is configured to swivel about the first shaft. The drive system also includes a gearbox connected to drive the first shaft, a diesel engine connected to drive the gearbox via a second shaft, and an electric motor connected to drive the first shaft via the gearbox or directly, whereby propulsion loads are shared between the diesel engine and the electric motor.

3 Claims, 12 Drawing Sheets

HYBRID POWER AND PROPULSION SYSTEM

BACKGROUND

1. Technical Field

Embodiments of the invention relate generally to marine propulsion. Particular embodiments relate to azimuthing drives for marine propulsion.

2. Discussion of Art

Marine propulsion can be accomplished by various means. Most commonly, a marine vessel is driven forward by a shaft-mounted propulsor external to the vessel, such as an open propeller or a shrouded screw. Also known are water jet propulsors, which are essentially screws shrouded by the marine vessel itself. Such means for propulsion can be configured as azimuthing drives, which include propulsors that can be swiveled about axes perpendicular to the thrust axis of the drive, thereby redirecting the thrust force within an azimuthal plane.

Conventionally, an azimuthing drive has its propulsor driven from a vertical shaft, which in turn is driven by a vertically- or horizontally-arranged engine, e.g., a diesel engine. For example, a horizontally-arranged engine will have its crankshaft extending in a horizontal plane. The horizontally-arranged engine crankshaft will drive the vertical shaft of the azimuthing drive via a bevel gear or the like.

In operation, efficiency of the propulsion system with azimuthing drive is limited by the fuel consumption profile of the driving engine (prime mover). Typically, an engine will have a first optimum range of operating speeds and loads, whereas a propulsor will have a different optimum range of operating speeds and loads. Intervening gearing can aid in achieving a desirable combination of engine speed and propulsor speed, however, it is difficult to provide efficient gearing that enables full use of the driving engine and of the propulsor throughout both optimum speed and loading ranges.

In view of the above, it may be desirable to provide an azimuthing drive system that enables better operation and utilization of the engine during the operation of the vessel than systems currently available.

BRIEF DESCRIPTION

In embodiments, an azimuthing drive system is provided for marine vessels. The azimuthing drive system includes a propulsion pod that houses a propulsor, which is configured to rotate about a first axis (e.g., a horizontal axis) and to be driven by a first shaft that is generally orthogonal to the first axis (e.g., a vertical shaft). The propulsion pod is configured to swivel about the first shaft. The drive system also includes a gearbox connected to drive the first shaft, an engine (e.g., a diesel engine) connected to drive the gearbox via a second shaft that is generally orthogonal to the first shaft (e.g., a horizontal shaft), and an electric motor. The electric motor is connected in one of the following ways: (i) to directly drive the first shaft; (ii) to drive the gearbox via a third shaft that is coaxial, coplanar, or in a plane parallel with the first shaft (e.g., another vertical shaft); or (iii) to drive the gearbox via a third shaft that is coaxial, coplanar, or in a plane parallel with the second shaft (e.g., another horizontal shaft). In any of the three configurations, propulsion loads can be shared or divided between the engine and the electric motor.

In embodiments, an azimuthing drive system is provided for marine vessels. The azimuthing drive system includes a propulsion pod that houses a propulsor, which is configured to rotate about a first axis (e.g., a horizontal axis) and to be driven by a first shaft that is generally orthogonal to the first axis (e.g., a vertical shaft). The propulsion pod is configured to swivel about the first shaft. The drive system also includes a gearbox connected to drive the first shaft, an engine (e.g., a diesel engine) connected to drive the gearbox via a second shaft that is generally orthogonal to the first shaft (e.g., a horizontal shaft), and an electric motor connected to drive the gearbox via a third shaft that is coaxial, coplanar, or in a plane parallel with the second shaft (e.g., another horizontal shaft), whereby propulsion loads are shared or divided between the engine and the electric motor.

In other embodiments, an azimuthing drive system is provided for marine vessels. The azimuthing drive system includes a propulsion pod that houses a propulsor, which is configured to rotate about a first axis (e.g., a horizontal axis) and to be driven by a first shaft that is generally orthogonal to the first axis (e.g., a vertical shaft). The propulsion pod is configured to swivel about the first shaft. The drive system also includes a gearbox connected to drive the first shaft, an engine (e.g., diesel engine) connected to drive the gearbox via a second shaft that is generally orthogonal to the first shaft (e.g., a horizontal shaft), and an electric motor connected to drive the gearbox via a third shaft that is coaxial, coplanar, or in a plane parallel with the first shaft (e.g., another vertical shaft), whereby propulsion loads are shared or divided between the engine and the electric motor.

In other embodiments, an azimuthing drive system is provided for marine vessels. The azimuthing drive system includes a propulsion pod that houses a propulsor, which is configured to rotate about a first axis (e.g., a horizontal axis) and to be driven by a first shaft that is generally orthogonal to the first axis (e.g., a vertical shaft). The propulsion pod is configured to swivel about the first shaft. The drive system also includes a gearbox connected to drive the first shaft, an engine (e.g., diesel engine) connected to drive the gearbox via a second shaft that is generally orthogonal to the first shaft (e.g., a horizontal shaft), and an electric motor connected to directly drive the first shaft, whereby propulsion loads are shared between the engine and the electric motor.

In other embodiments, a method is provided, e.g., a method of propelling a marine vessel. The method includes operating at least one of an engine or an electric motor to drive a common gearbox under one of a plurality of modes of operation. Under at least one of the plural modes of operation the electric motor and the engine are operated concurrently with respect to the common gearbox. The method also includes transferring power from the common gearbox to a propulsor that propels the marine vessel, and swiveling the propulsor about a shaft that drivingly connects the propulsor with the common gearbox.

DRAWINGS

The present invention will be better understood from reading the following description of non-limiting embodiments, with reference to the attached drawings, wherein below:

DETAILED DESCRIPTION

Figure 1:
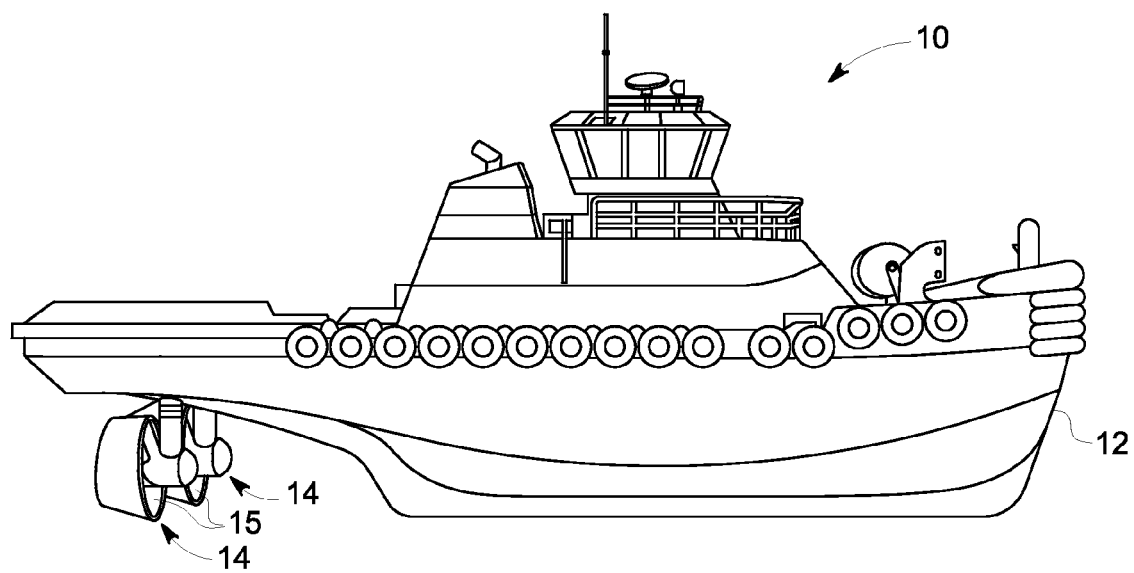
FIG. 1 shows in side view a marine vessel having an azimuthing propulsion unit.

Reference will be made below in detail to exemplary embodiments of the invention, examples of which are illustrated in the accompanying drawings. Wherever possible, the same reference characters used throughout the drawings refer to the same or like parts, without duplicative description. Aspects of the invention relate to marine vessels.

As used herein, the terms "substantially," "generally," and "about" indicate conditions within reasonably achievable manufacturing and assembly tolerances, relative to ideal desired conditions suitable for achieving the functional purpose of a component or assembly.

As shown in FIG. 1, a marine vessel 10 (e.g., a tug boat) has a hull 12 for floating in a body of water. The hull 12 mounts azimuthing propulsion units 14, e.g., there may be two azimuthing propulsion units 14. Each of the azimuthing propulsion units 14 includes a propulsor 15 that is configured to rotate about a first (horizontal) axis. As further discussed below, each of the propulsion units 14 is configured to swivel or "azimuth" the propulsor 15 about a second (vertical) axis that is generally orthogonal to the first axis.

Figure 2:
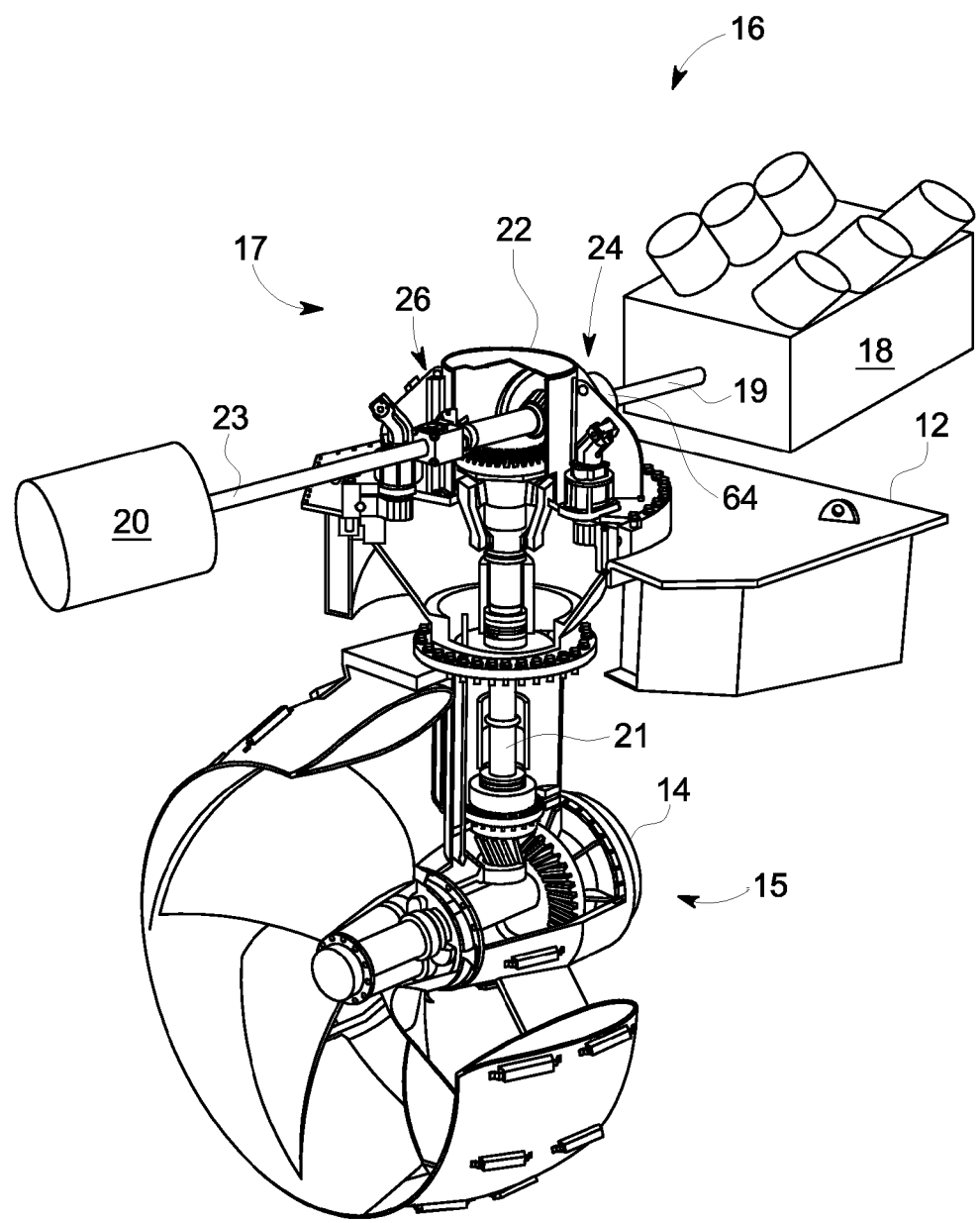
FIG. 2 shows in perspective schematic view a hybrid azimuthing propulsion system, according to a first embodiment of the invention.

Referring to FIG. 2, in a first embodiment of the invention, e.g., a "T arrangement" 16, each azimuthing propulsion unit 14 is configured such that its propulsor 15 can be driven from a hybrid power system 17 via a first (e.g., vertical) shaft 21. The hybrid power system 17 includes a propulsion engine 18 (e.g., a diesel propulsion engine) and an electric motor 20, each of which drive the first shaft 21 via a common gearbox 22. The first shaft 21 defines the axis about which the propulsor 15 can be swiveled. The arrangement 16 is generally referred to as a "T" arrangement because the shaft 19 of the engine 18 and the shaft 23 of the electric motor 20 form a "T" shape with the first shaft 21.

In embodiments, the engine 18 has a designated running speed and load range for optimum fuel efficiency. Typically, the optimum load range is 40-90% of maximum rated power. The electric motor 20 may operate on any of fixed or variable voltage DC, or fixed or variable voltage and frequency AC. The electric motor 20 has an optimum speed range that is a function of the number of rotor/stator poles and the applied voltage (for DC supply) or is a function of the applied frequency (for AC supply).

The common gearbox 22 includes a first bevel gear set 24 for driving connection of the engine 18, and includes a second bevel gear set 26 for driving connection of the electric motor 20. Advantageously, providing the separate bevel gear sets 24, 26 permits different reduction ratios for the engine 18 and for the electric motor 20, such that the electric motor 20 can be run at a higher speed than the engine 18. Thus, both the engine 18 and the electric motor 20 can be run within their optimal (energy efficient) speed ranges. For example, diesel engines typically provide their best fuel efficiency at moderate speed and relatively high torque, while electric motors designed to run at a high speed will occupy a smaller volume for the same power as can be achieved by a low speed electric motor in a larger volume. Thus, in certain embodiments, the engine 18, comprising a diesel propulsion engine, is run at a relatively low operating speed of between about 700 rpm and about 2000 rpm, while the electric motor 20 is run over a wider operating speed range of about 200 rpm to 3600 rpm.

Additionally, the bevel gears enable the engine 18 and the electric motor 20 both to be arranged with their respective shafts extending horizontally. Thus, in certain embodiments the engine 18 and the electric motor 20 are arranged shaft-parallel. In other embodiments, the engine 18 and the electric motor 20 are arranged shaft-skewed (e.g., with the shafts orthogonal so that the electric motor extends abeam within the marine vessel). Thus, the shafts 19, 23 may be coaxial, coplanar, or in parallel planes.

Figure 3:
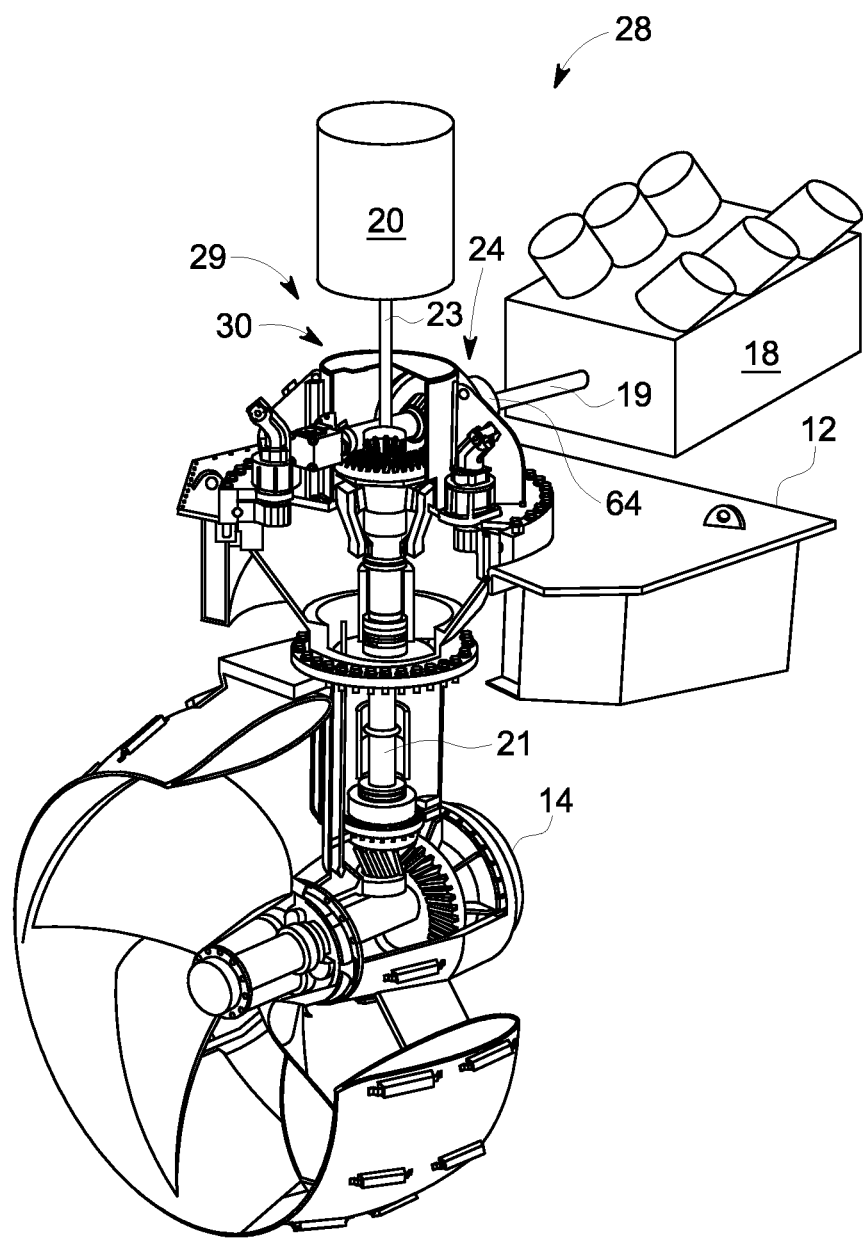
FIG. 3 shows in perspective schematic view a hybrid azimuthing propulsion system, according to a second embodiment of the invention.

Referring to FIG. 3, in a second embodiment of the invention, e.g., a vertical motor arrangement 28, the engine 18 (e.g., diesel propulsion engine) and the electric motor 20 are connected with the first shaft 21 via a common gearbox 29. The gearbox 29 includes the first bevel gear set 24 as well as a ring gear set 30 for connecting the electric motor. The ring gear set 30 is used because in the vertical motor arrangement 28, the electric motor 20 is provided with its shaft coaxial, coplanar, or in a parallel plane with the first shaft 21. In other words the electric motor 20 is vertically mounted. This configuration conserves horizontal space. Additionally, use of the ring gear set 30 enables a higher speed reduction ratio for the electric motor 20.

Figure 4:
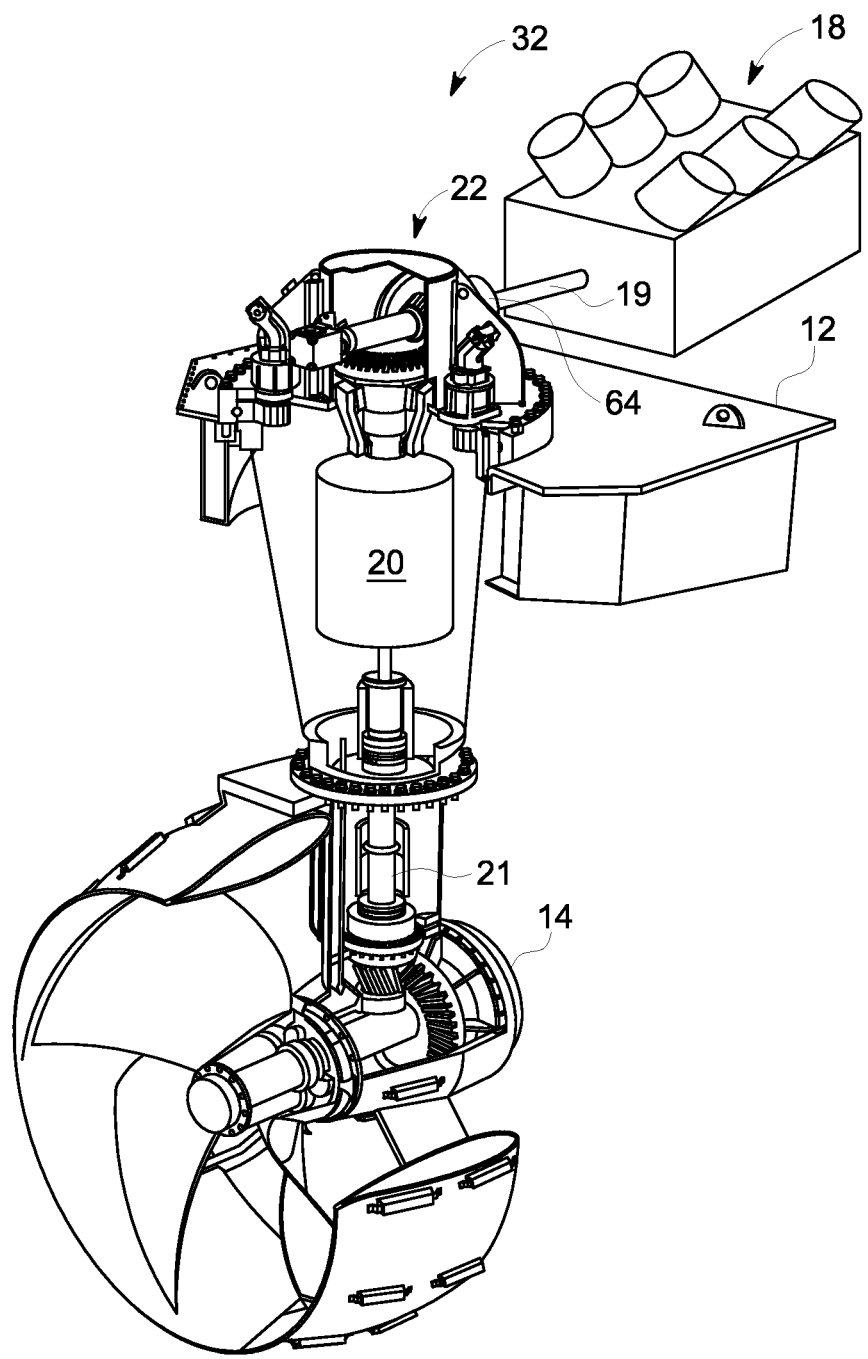
FIG. 4 shows in perspective schematic view a hybrid azimuthing propulsion system, according to a third embodiment of the invention.

FIG. 4 shows a third embodiment of the invention, e.g., an "L arrangement" 32, in which the electric motor 20 directly drives the first shaft 21. Thus, the electric motor 20 can be operated either as a motor (assisting the engine 18 in driving the first shaft 21), or as a brake/generator (being driven by the engine 18 via the gearbox 22 and the first shaft 21, or being driven by the propulsor 15 via the first shaft 21); or the electric motor 20 can be non-operative, in other words, neither driving nor driven by the first shaft 21. In this third embodiment there is no speed reduction for the electric motor 20, thus, in some applications, a relatively large motor needs to be used. However, direct shaft drive mitigates gearing losses associated with the second bevel gear set 26 or with the ring gear set 30, thereby increasing the overall drive efficiency relative to the T arrangement 16 or the vertical motor arrangement 28.

Figure 5:
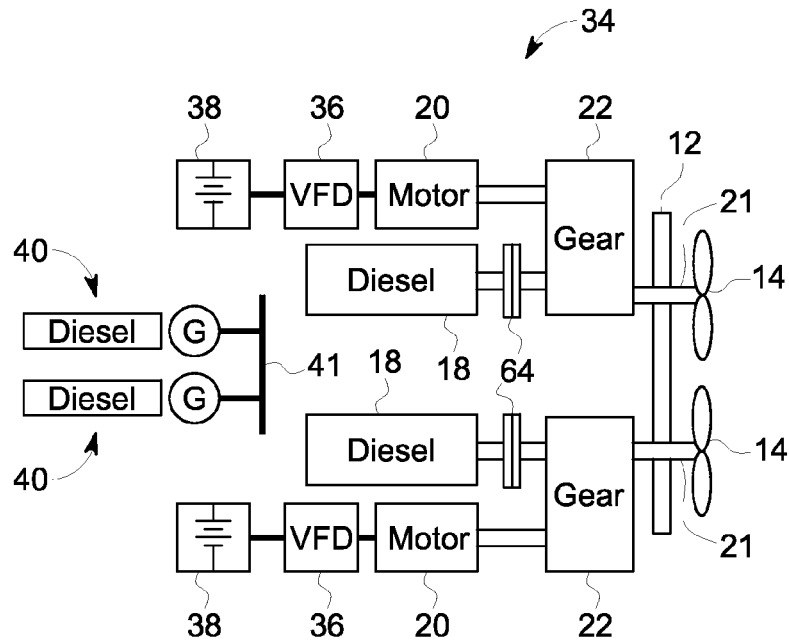
FIG. 5 shows in schematic view a hybrid power and propulsion system, according to a fourth embodiment of the invention.

While various mechanical arrangements have been shown, numerous electromotive configurations also are within the scope of the invention. For example, FIG. 5 shows schematically a first configuration 34, in which the vertical shafts 21 of the propulsion units 14 are driven by engines 18 ("Diesel") (e.g., diesel propulsion engines) and electric motors 20 ("Motor") via gear boxes 22 ("Gear"). Each electric motor 18 is powered from an associated battery 38 via a variable frequency drive 36 ("VFD"). In the illustrated configuration, the electric motors are AC (alternating current) motors. The variable frequency drive 36 receives DC (direct current) electrical power from the battery 38, and delivers AC electrical power to the electric motor 18. Alternatively, the variable frequency drive 36 can be configured as a DC-DC power converter to drive a DC electrical motor 20. Separately, generator sets 40 (e.g., diesel generator sets, or generator sets driven by other fuels) provide electrical power to a marine vessel's auxiliary bus 41, to which auxiliary electrical loads (e.g., hydraulics, air handling, navigation, communications, etc.) are connected. Not shown are connections for recharging the batteries 38 from the vessel's auxiliary bus 41.

Figure 6:
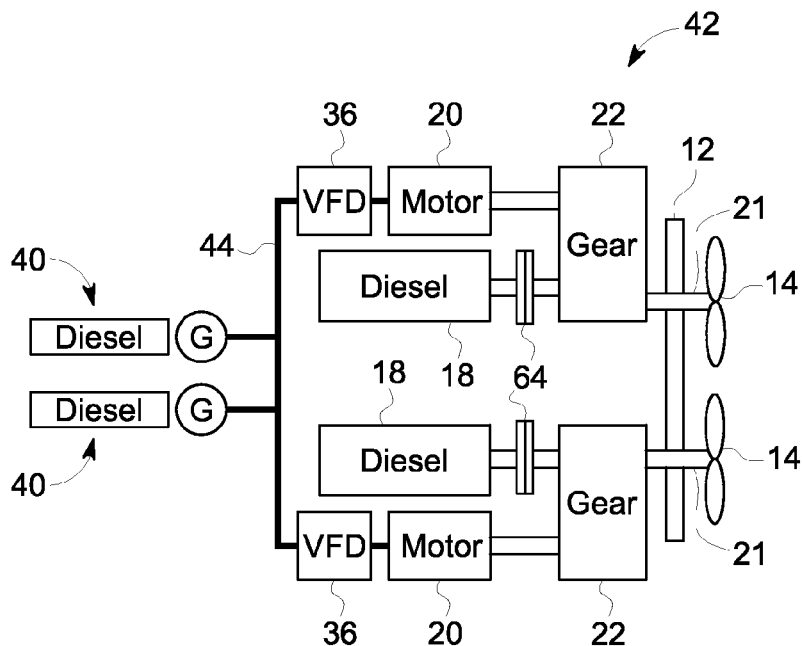
FIG. 6 shows in schematic view a hybrid power and propulsion system, according to a fifth embodiment of the invention.

FIG. 6 shows a second configuration 42, in which the diesel generator sets 40 provide electrical power to a master bus 44. The master bus 44 powers both of the vessel's auxiliary loads (as discussed above), as well as the electric motors 20. Thus, in the second configuration 42, the generator sets 40 take on the role of the batteries 38 as shown in the first configuration 34.

Figure 7:
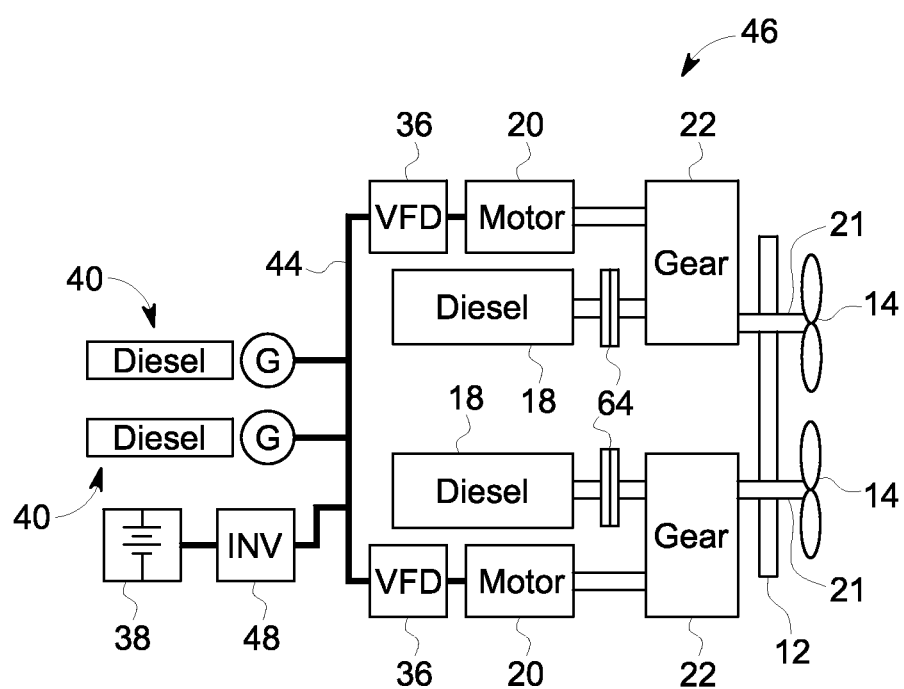
FIG. 7 shows in schematic view a hybrid power and propulsion system, according to a sixth embodiment of the invention.

Referring to FIG. 7, a third configuration 46 is contemplated, in which a battery 38 is connected via an inverter 48 ("INV") to the master bus 44. In this case, the battery 38 provides an emergency backup or reserve power to the diesel generators 40.

Figure 8:
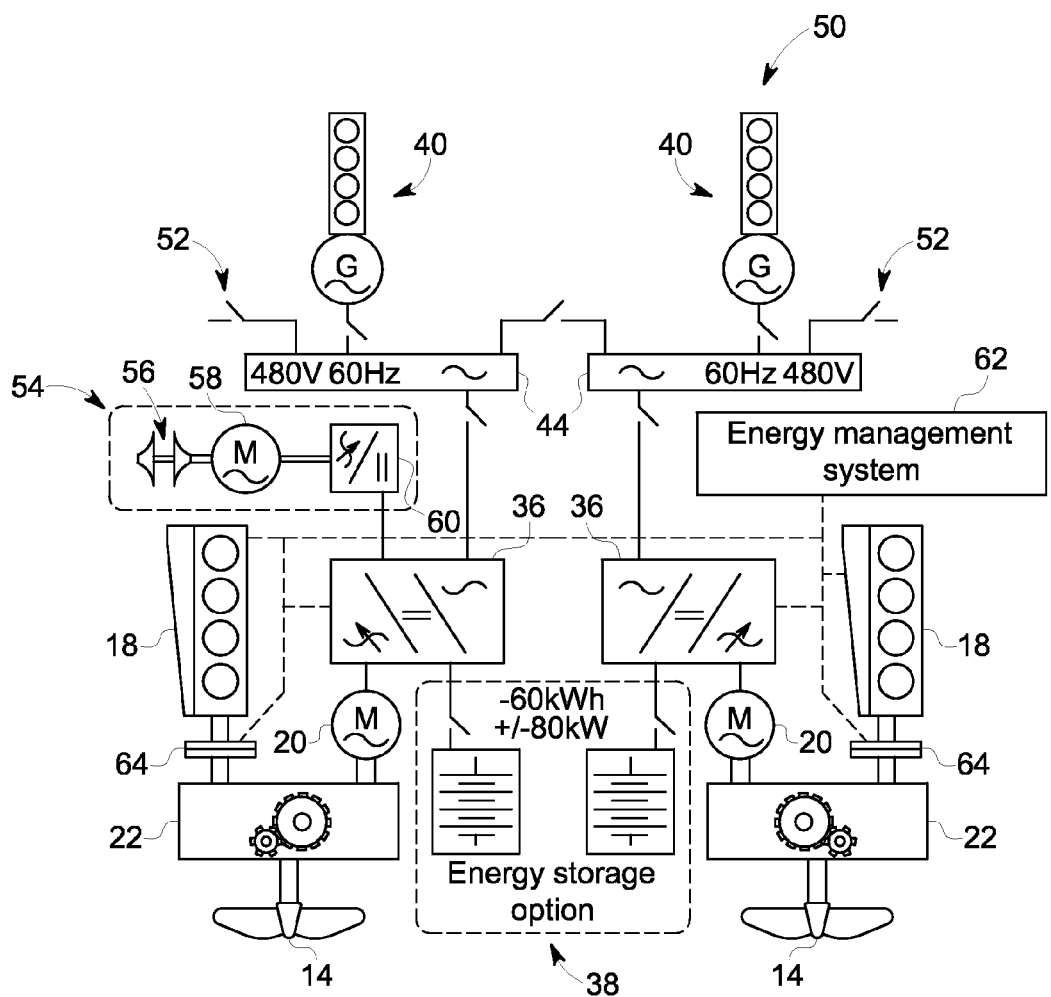
FIG. 8 shows in schematic view a hybrid power and propulsion system, according to a seventh embodiment of the invention.

FIG. 8 shows a fourth configuration 50, in which shore power connections 52 are provided for powering the master bus 44 during periods when the generator sets 40 and the battery 38 are secured (not active). In the fourth configuration 50, an electrically drivable superturbocharger 54 (an "e-turbo") also is provided. The e-turbo 54 includes a turbocharger 56, an electric turbomotor 58, and an inverter 60. The turbocharger 56 is connected to be driven by exhaust gases from the engines 18. The turbocharger 56 also is connected to supply pressurized intake air to the engines 18, thereby boosting power output and fuel efficiency. However, a minimum pressure and flow rate of exhaust gas is needed for adequately driving the turbocharger 56. Typically, exhaust gas flow lags engine power output, such that the turbocharger 56 would become available to boost power output only after power output increased. In order to make the turbocharger 56 available in advance of, or during, an increase of engine load, the electric turbomotor 58 is connected to be powered from one of the variable frequency drive units 36 via the inverter 60, and is connected to drive the turbocharger 56 at the beginning of an upward engine load transient. Optionally, the e-turbo 54 also may include a supercharger (not shown) that may be connected to be mechanically driven by the engines 18 and to supply pressurized intake air to the engines 18.

Each of the configurations 34, 42, 46, 50 is operable in a variety of modes, under control of an energy management or automation system 62 which can automate/control usage of the engines 18 and of the electric motors 20 to lower emissions and to provide required propulsion and electrical power and transient response. For example, the energy management system 62 can select a mode of operation based on a level of propulsion demand (ordered speed), as shown in FIG. 9.

Figure 9:
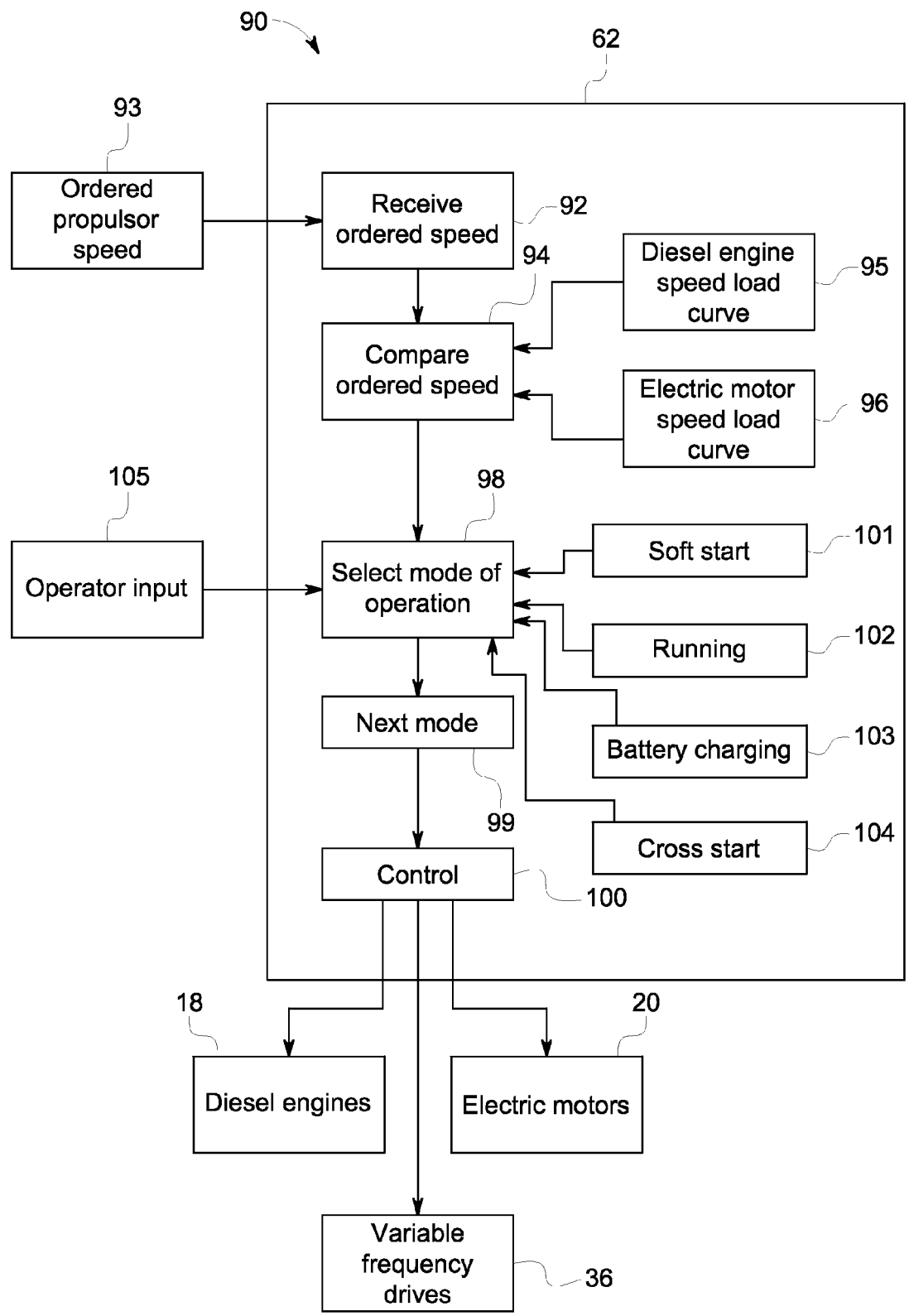
FIG. 9 shows an algorithm for selecting a mode of operation of a hybrid power and propulsion system, according to an embodiment.

FIG. 9 shows an algorithm/method 90 that is implemented by the energy management system 62 for operating at least one of the engines 18 and/or the electric motors 20 to drive the common gearboxes 22 under one of a plurality of modes of operation. The algorithm 90 is implemented for selecting a next mode of operation under which the energy management system will control the engines 18 (e.g., diesel propulsion engines), the electric motors 20, the variable frequency drives 36, and, optionally, the e-turbo 54. Under at least one of the plural modes of operation, an electric motor 20 and an engine 18 are operated concurrently with respect to the common gearbox 22, that is, the engine 18 and the motor 20 interact via the gearbox 22, for example, by jointly driving the gearbox, or by one driving the other via the gearbox.

The algorithm 90 includes receiving 92 an ordered propulsor speed 93, which equates to different speeds and loadings of the engines 18 or the electric motors 20, based on the gearing of the gearbox 22. The algorithm 90 also includes comparing 94 the ordered propulsor speed 93 to a speed/load curve 95 of the engines 18, and to a speed/load curve 96 of the electric motors 20. (While the term "curve" is used, lookup tables or equations could equally be used.) The algorithm 90 then includes selecting 98 the next mode of operation 99. Finally, the algorithm 90 includes controlling 100 the engines 18 and the electric motors 20, according to the next mode of operation 99. For example, where the ordered propulsor speed 93 equates to less than an optimal running speed of the engines 18, the algorithm 90 selects between a first mode of operation 101 or a fourth mode of operation 104, based on an operator input 105. Where the ordered propulsor speed 93 would require exceeding an optimal speed range of the engines 18, the algorithm 90 selects a second mode of operation 102. Where the ordered propulsor speed 93 would equate to a load below an optimal load range of the engines 18, the algorithm 90 selects a third mode of operation 103.

Figure 10:
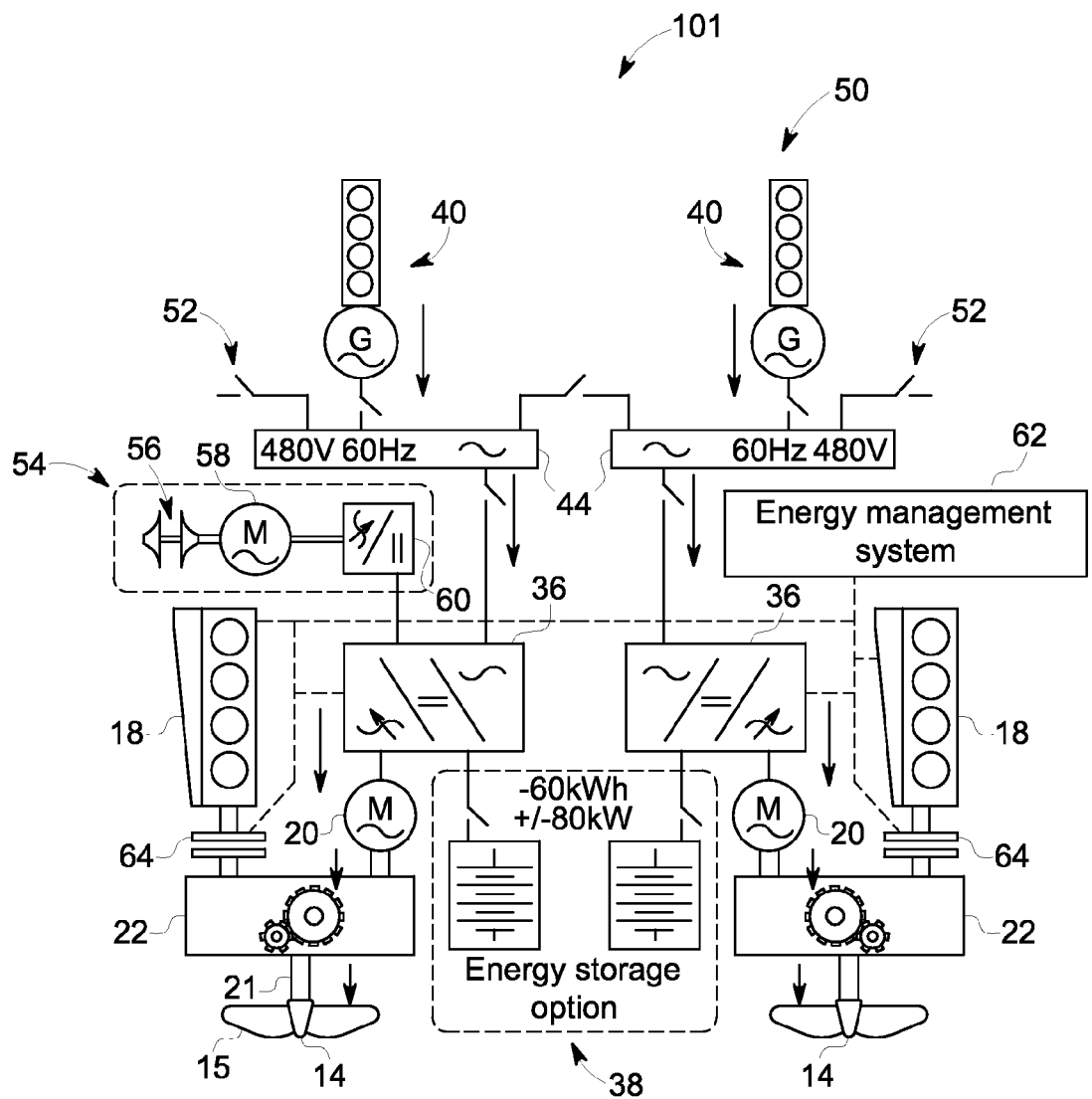
FIG. 10 shows a first mode of operation of the hybrid power and propulsion system, according to an embodiment.

For example, as shown in FIG. 10, under the first (soft start or emergency) mode of operation 101, the variable frequency drives 36 are adjusted to supply electrical power from the master bus 44 to the electric motors 20. The electric motors 20 then drive the gearboxes 22, while the engines 18 (e.g., diesel propulsion engines) are disconnected from the gearboxes 22 by disengaging clutches 64. Under the soft start mode of operation the electric motors 20 bring the gearboxes 22 up to optimal running speed of the engines 18, while the engines are started under no-load condition. Then the clutches 64 are engaged to shift the propulsion load over to the engines 18. This mode of operation enables the engines 18 to start under no-load conditions, and enables the clutches 64 to be engaged with equal speeds at both sides, thereby reducing engine start up fuel consumption and lengthening clutch life. Additionally, this mode of operation enables low-speed propulsion when the engines 18 are unavailable due to mechanical casualty or operational constraints.

Figure 11:
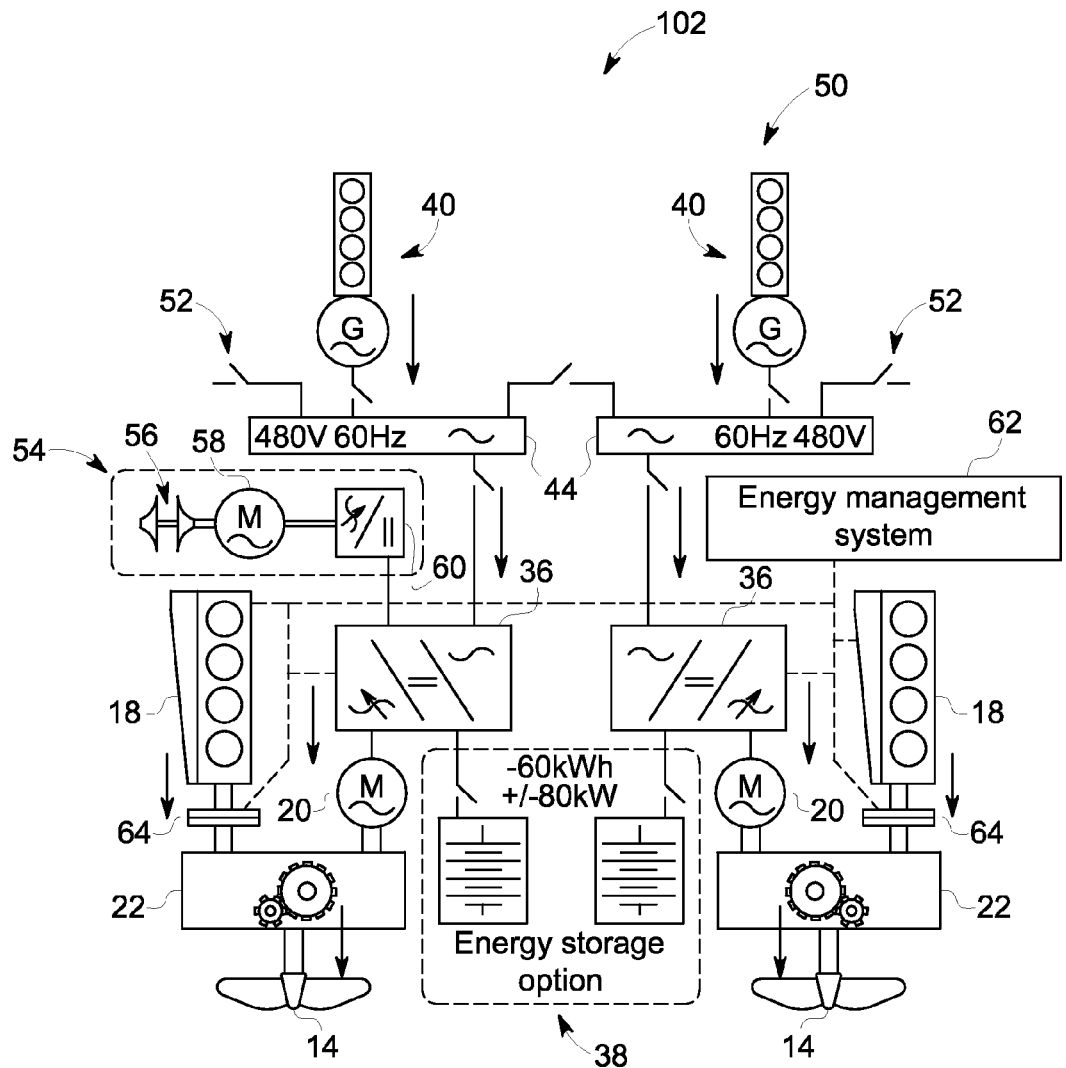
FIG. 11 shows a second mode of operation of the hybrid power and propulsion system, according to an embodiment.

Under the second (running) mode of operation 102, as shown in FIG. 11, the engines 18 (e.g., diesel propulsion engines) and the variable frequency drives 36 are adjusted to achieve desired rotational speed and power at the azimuthing propulsion units 14. Generally, the engines 18 carry the propulsion load, with the variable frequency drives 36 providing power to the electric motors 20 as needed to smooth load transients (e.g., for a sudden change in ordered shaft speed, the electric motors 20 provide additional torque while the engines 18 come up to speed). Additionally, the electric turbomotor 58 can be energized to spool up the e-turbo 54 in advance of or during the engine load transient, thereby eliminating turbo lag. This means that pressurized intake air can be immediately supplied to support a further increase of engine power, while enhancing thermal efficiency of the engines 18.

Figure 12:
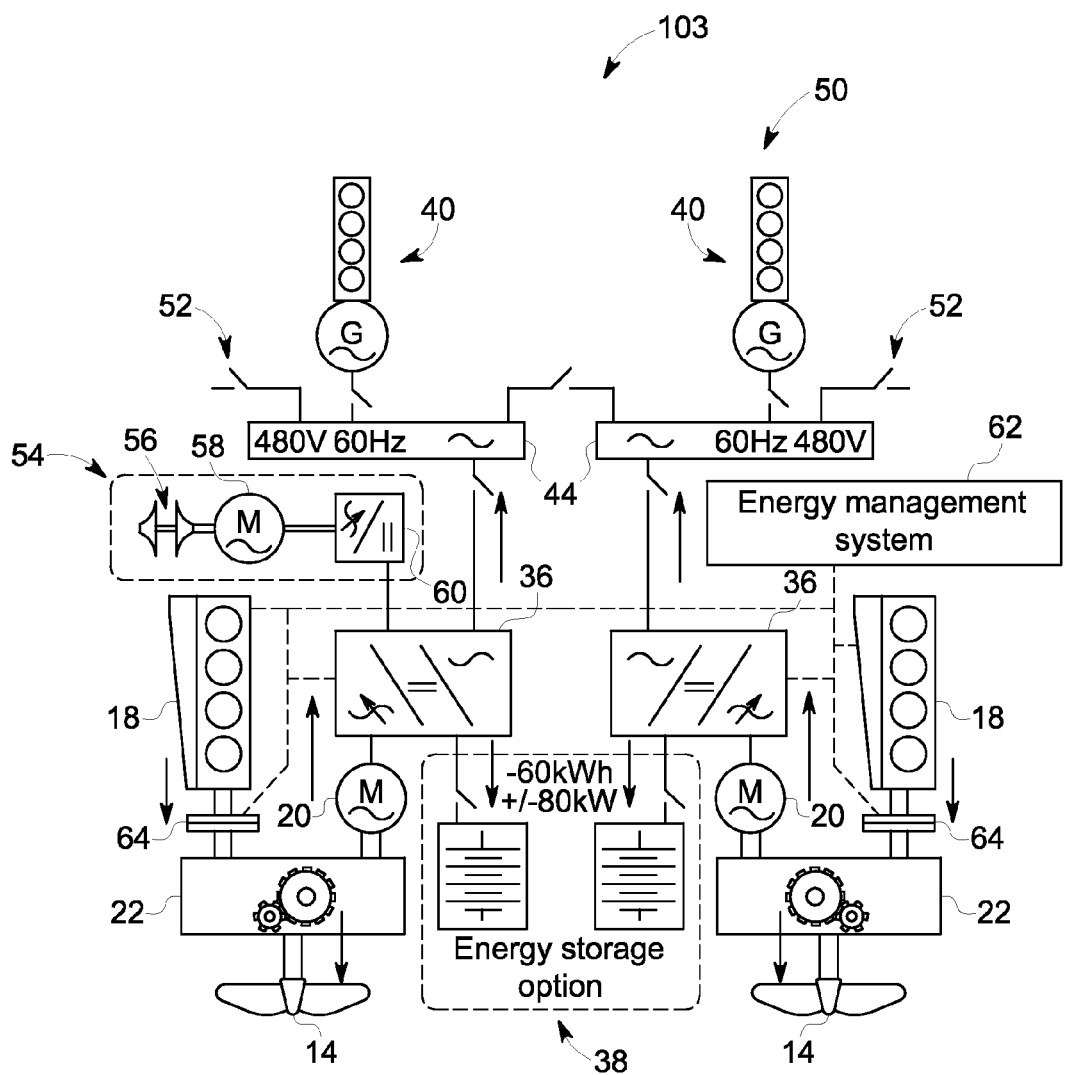
FIG. 12 shows a third mode of operation of the hybrid power and propulsion system, according to an embodiment.

Under the third (battery charging) mode of operation 103, shown in FIG. 12, the electric motors 20 are driven from the gearboxes 22 to act as generators, while the variable frequency drives 36 are adjusted to supply electrical power from the electric motors to the master bus 44. Thus, the engines 18 (e.g., diesel propulsion engines) can charge the batteries 38 via the gearboxes 22, the electric motors 20, and the variable frequency drives 36. This mode of operation may be used where a propulsion load is less than an optimal load range of the engines 18 (e.g., less than 80% of rated load) but exceeds an optimal load range of the electric motors 20.

Figure 13:
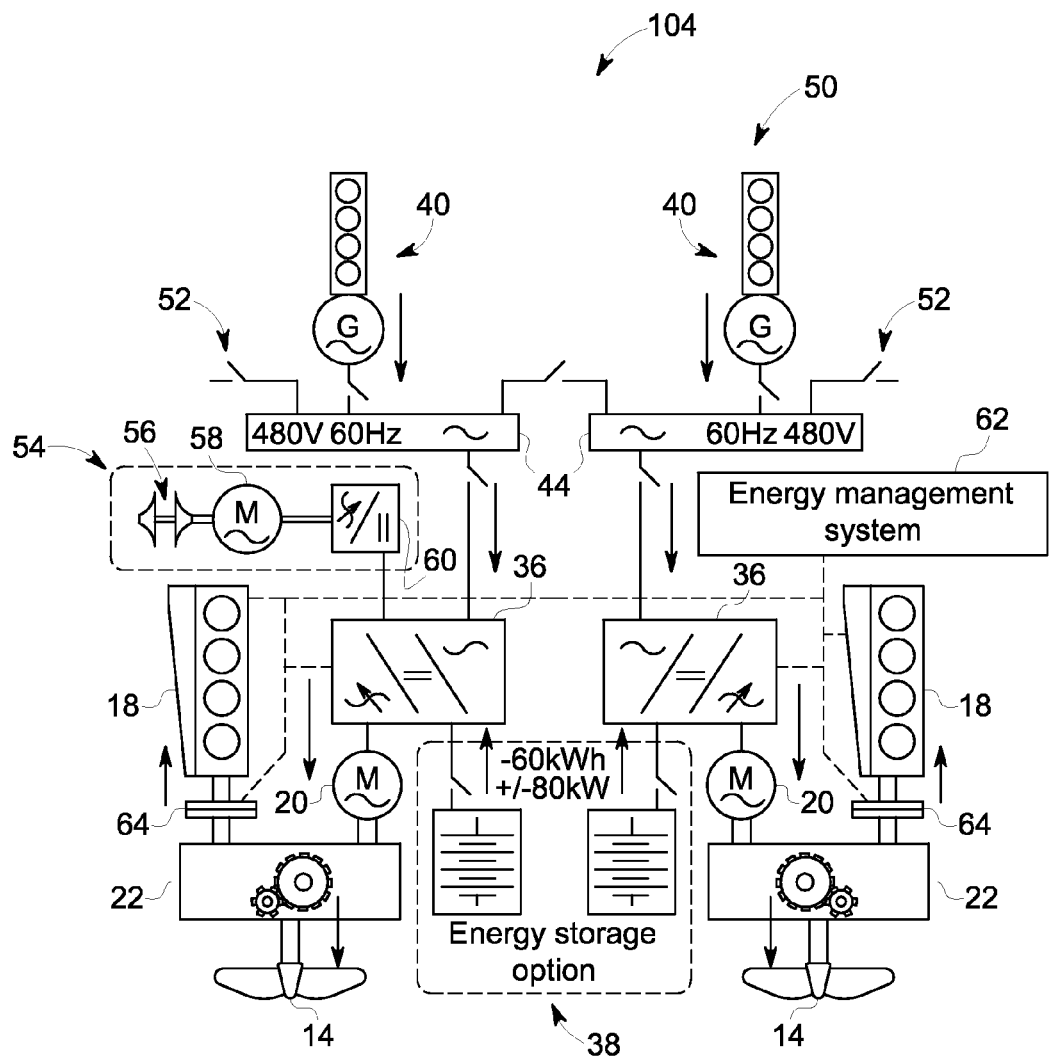
FIG. 13 shows a fourth mode of operation of the hybrid power and propulsion system, according to an embodiment.

Under the fourth (cross start) mode of operation 104, as shown in FIG. 13, the variable frequency drives 36 are adjusted to supply electrical power from the master bus 44 to the electric motors 20. The electric motors 20 drive the gearboxes 22 to start the engines 18 (e.g., diesel propulsion engines) via the clutches 64. Unlike the soft start mode of operation, the clutches 64 are engaged throughout engine startup. The cross start mode of operation, similar to the soft start mode, conserves fuel by having the electric motors 20 carry propulsion load while the engines 18 come up to running speed. Additionally, use of the electric motors 20 as starter motors enables the engines 18 to be provided without starter motors, thereby diminishing total system weight.

In embodiments, the energy management system is configured to provide one of the four modes of operation, or two or three of the four modes of operation. In other embodiments, the energy management system is configured to provide all four modes of operation: a first mode of operation in which the electric motor drives the gearbox while the clutch is disengaged; a second mode of operation in which the electric motor drives the gearbox and the engine while the clutch is engaged; a third mode of operation in which the electric motor and the engine together drive the gearbox which in turn drives the propulsor; and a fourth mode of operation in which the engine drives the gearbox and the electric motor.

Thus, in embodiments, an azimuthing drive system is provided for marine vessels. The azimuthing drive system includes a propulsion pod that houses a propulsor, which is configured to rotate about a first axis and to be driven by a first shaft that is generally orthogonal to the first axis. The propulsion pod is configured to swivel about the first shaft. The drive system also includes a gearbox connected to drive the first shaft, a diesel engine or other engine connected to drive the gearbox via a second shaft that is generally orthogonal to the first shaft, and an electric motor connected to drive the gearbox via a third shaft that is coaxial, coplanar, or in a plane parallel with the second shaft, whereby propulsion loads are shared or divided between the engine and the electric motor.

In other embodiments, an azimuthing drive system is provided for marine vessels. The azimuthing drive system includes a propulsion pod that houses a propulsor, which is configured to rotate about a first axis and to be driven by a first shaft that is generally orthogonal to the first axis. The propulsion pod is configured to swivel about the first shaft. The drive system also includes a gearbox connected to drive the first shaft, a diesel engine or other engine connected to drive the gearbox via a second shaft that is generally orthogonal to the first shaft, and an electric motor connected to drive the gearbox via a third shaft that is coaxial, coplanar, or in a plane parallel with the first shaft, whereby propulsion loads are shared or divided between the engine and the electric motor.

In other embodiments, an azimuthing drive system is provided for marine vessels. The azimuthing drive system includes a propulsion pod that houses a propulsor, which is configured to rotate about a first axis and to be driven by a first shaft that is generally orthogonal to the first axis. The propulsion pod is configured to swivel about the first shaft. The drive system also includes a gearbox connected to drive the first shaft, a diesel engine or other engine connected to drive the gearbox via a second shaft that is generally orthogonal to the first shaft, and an electric motor connected to directly drive the first shaft, whereby propulsion loads are shared between the engine and the electric motor.

In embodiments, the azimuthing drive system further includes a clutch provided in the shaft between the diesel engine or other engine and the gearbox, and an energy management system configured to automatically operate the electric motor, the engine, and the clutch, so as to provide multiple modes of operation of the azimuthing drive system. For example, in a first mode of operation, the electric motor drives the gearbox while the clutch is disengaged. In a second mode of operation, the electric motor drives the gearbox and the engine. In a third mode of operation, the electric motor and the engine drive the gearbox. In a fourth mode of operation, the engine drives the gearbox and the electric motor.

Thus, a method of propelling a marine vessel, according to aspects of the invention, comprises operating at least one of an engine or an electric motor to drive a common gearbox, transferring power from the common gearbox to a propulsor that propels the marine vessel, and swiveling the propulsor about a shaft that drivingly connects the propulsor with the common gearbox. In at least one mode of operation, the electric motor and the engine are operated concurrently with respect to the common gearbox.

In embodiments, the engine is a diesel engine configured to operate within an optimum speed range of about 700 rpm to about 2000 rpm. In embodiments, the electric motor is configured to operate at an optimum speed of about 3600 rpm.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described azimuthing drive system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An azimuthing drive system for marine vessels, comprising:
    a propulsion pod housing a propulsor that is configured to rotate about a first axis and that is configured to be driven by a first shaft generally orthogonal to the first axis, the propulsion pod being configured to swivel about the first shaft;
    a gearbox connected to drive the first shaft;
    an engine connected to drive the gearbox via a second shaft generally orthogonal to the first shaft;
    an electric motor connected to drive the first shaft either directly or via a third shaft that is connected to drive the gearbox;
    a variable frequency drive for driving the electric motor; and
    an energy management system configured to control the engine, the variable frequency drive, and at least one clutch in order to share propulsion loads among the engine and the electric motor, according to an algorithm that includes:
    comparing an ordered propulsor speed to a speed/load curve of the engine;
    comparing the ordered propulsor speed to a speed/load curve of the electric motor; and
    selecting a next mode of operation for achieving the ordered propulsor speed,
    wherein for an ordered propulsor speed that is less than an optimal running speed of the engine, the energy management system selects the next mode of operation to be a first mode wherein the electric motor alone drives the first shaft, or a second mode wherein the electric motor drives the engine for starting the engine;
    wherein for an ordered propulsor speed that is greater than an optimal speed range of the engine, the energy management system selects the next mode of operation to be a third mode wherein the engine and the electric motor are coordinated to drive the first shaft;
    wherein for an ordered propulsor speed that would result in a load less than an optimal load range of the engine, the energy management system selects the next mode of operation to be a fourth mode wherein the engine drives the first shaft and drives the electric motor as a generator.

2. The apparatus of claim 1, wherein under the third mode of operation the energy management system selects among a first submode wherein the engine alone drives the first shaft or a second submode wherein the engine and the electric motor together drive the first shaft.

3. The apparatus of claim 1, wherein the energy management system is further configured to transition from the first mode of operation to the third mode of operation via a soft start mode.

* * * * *